(12) United States Patent
Kawashima et al.

(10) Patent No.: US 8,786,147 B2
(45) Date of Patent: Jul. 22, 2014

(54) TOTALLY-ENCLOSED HORIZONTAL ROTATING ELECTRIC MACHINE

(75) Inventors: Koji Kawashima, Tokyo (JP); Fumio Matsumoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 155 days.

(21) Appl. No.: 13/583,736

(22) PCT Filed: Jun. 28, 2010

(86) PCT No.: PCT/JP2010/060948
§ 371 (c)(1),
(2), (4) Date: Sep. 10, 2012

(87) PCT Pub. No.: WO2012/001757
PCT Pub. Date: Jan. 5, 2012

(65) Prior Publication Data
US 2013/0002065 A1    Jan. 3, 2013

(51) Int. Cl.
*H02K 9/00* (2006.01)
*H02K 5/20* (2006.01)

(52) U.S. Cl.
CPC .................................. *H02K 5/20* (2013.01)
USPC ................... 310/54; 310/52; 310/56; 310/64

(58) Field of Classification Search
CPC ............. H02K 5/20; H02K 9/19; H02K 9/20
USPC ............................................... 310/52–59, 64
See application file for complete search history.

(56) References Cited

U.S. PATENT DOCUMENTS 4,198,191 A * 4/1980 Pierce .......................... 417/369
5,225,449 A   7/1993 Tada et al.
(Continued)

FOREIGN PATENT DOCUMENTS

| JP | 30-3112 B1 | 5/1955 |
|---|---|---|
| JP | 51-141305 | 12/1976 |
| JP | 55-043371 U | 3/1980 |
| JP | 57-068641 A | 4/1982 |
| JP | 57-095064 | 6/1982 |
| JP | 1-321838 A | 12/1989 |
| JP | 3-261347 A | 11/1991 |
| JP | 5-038096 A | 2/1993 |
| JP | 6-339251 A | 12/1994 |
| JP | 2007-089255 A | 4/2007 |

OTHER PUBLICATIONS

International Search Report (PCT/ISA/210) issued on Sep. 14, 2010, by the Japanese Patent Office as the International Searching Authority for International Application No. PCT/JP2010/060948.
Office Action issued on Oct. 1, 2013, by the Japanese Patent Office in corresponding Japanese Patent Application No. 2012-522363, and an English Translation of the Office Action. (7 pages).

*Primary Examiner* — Thanh Lam
(74) *Attorney, Agent, or Firm* — Buchanan Ingersoll & Rooney PC

(57) ABSTRACT

In a totally-enclosed horizontal rotating electric machine in which a rotor horizontally arranged and a stator arranged at an outer circumference side of the rotor are hermetically sealed in a main frame, and the rotor and the stator are cooled by circulating refrigerant gas, which is encapsulated in the main frame, through a refrigerant passageway, and water-cooled heat exchangers for cooling the refrigerant gas are provided on the way of the refrigerant passageway, the heat exchangers are respectively arranged in a longitudinal direction at each of positions neighboring both left-right end portions at a front side and both left-right end portions at a rear side of the main frame, and a feed-water inlet and a drain outlet of cooling water are provided at an upper side of the heat exchangers.

8 Claims, 5 Drawing Sheets

(56) References Cited

U.S. PATENT DOCUMENTS

| | | | | |
|---|---|---|---|---|
| 5,629,573 | A | * | 5/1997 | Ponnappan et al. ............ 310/64 |
| 5,939,808 | A | * | 8/1999 | Adames ......................... 310/89 |
| 6,176,092 | B1 | * | 1/2001 | Butterworth et al. ............ 62/84 |
| 6,994,602 | B2 | * | 2/2006 | Ries ................................. 440/6 |
| 2001/0037651 | A1 | * | 11/2001 | Butterworth et al. ........... 62/193 |
| 2004/0266277 | A1 | * | 12/2004 | Ries ................................. 440/6 |
| 2005/0156470 | A1 | * | 7/2005 | Gromoll et al. ................. 310/52 |
| 2005/0194847 | A1 | * | 9/2005 | Gromoll et al. ................. 310/54 |
| 2006/0059937 | A1 | * | 3/2006 | Perkins et al. ............... 62/259.2 |
| 2008/0179973 | A1 | * | 7/2008 | Kreitzer et al. ................. 310/53 |
| 2010/0102655 | A1 | * | 4/2010 | Eriksen et al. .................. 310/63 |

* cited by examiner

TOTALLY-ENCLOSED HORIZONTAL ROTATING ELECTRIC MACHINE

TECHNICAL FIELD

The present invention relates to a totally-enclosed horizontal rotating electric machine having heat exchangers which are vertically disposed at four corners of a main unit of the rotating electric machine, and particularly relates to an improvement for an attachment configuration of the heat exchangers.

BACKGROUND ART

In conventional horizontal rotating electric machines having heat exchangers which are vertically disposed, there is a well-known totally-enclosed electric motor having a configuration as indicated in FIG. 6.

FIG. 6 is a front view illustrating the electric motor viewed from an axis direction of a rotational shaft. A frame 32 is provided around a motor main body 31, and a cooling device 33 is attached to the frame 32. The motor main body 31, the frame 32, and the cooling device 33 are integrally installed in space formed by an outer frame 34 and a base 35, whereby the totally-enclosed electric motor is configured. The electric motor is configured in such a way that a feed-water pipe 36 and a drain pipe 37, which are extended from an outside of the electric motor, are connected to the cooling device 33, and air in the electric motor is cooled by passing cooling water, whereby a temperature of the motor main body 31 is suppressed under a predefined value (for example, refer to Patent Document 1).

CONVENTIONAL ART DOCUMENT

Patent Document

Patent Document 1: Utility Model Publication Number S55-43371 (Page 2, FIG. 1)

SUMMARY OF THE INVENTION

Problems to be solved by the Invention

In the electric motor configured as Patent Document 1, there have been problems described in the following description. Namely, a feed-water inlet and a drain outlet of the cooling device 33 is disposed at an lower side of the cooling device 33, so that a feed-water pipe 36 and a drain pipe 37 are connected at the lower side of the cooling device 33, and connection-working space for contact portions contacted to a feed-water pipe and a drain pipe, which are disposed in a pit 38 on the base of the electric motor, is required at the lower side of the cooling device 33. Moreover, a water chamber for temporarily store cooling water is required at a lower side in the cooling device 33. Although a main portion of a heat exchanger is disposed above the water chamber, a length of the main portion of the heat exchanger is reduced in accordance with heights of the water chamber and the connection-working space for the contact portions, and processing amount of heat is limited. Therefore, there have been problems in that a cooling capacity of the heat exchanger is suppressed, and output power of the rotating electric machine is limited.

Moreover, a hermetic seal is required at a portion where the feed-water pipe 36 and the drain pipe 37 are penetrated through the base 35, so that a cumbersome assembling work is required, and contact portions for the feed-water pipe 36 and the drain, pipe 37 are scattered at four corners of the motor main body 31. Therefore, there have been problems in that a pathway of the distribution pipes installed in the pit 38 on the base is complicated, and troublesome work is required.

Furthermore, a main unit of the rotating electric machine and the cooling device (heat exchanger) is covered by an integrated outer frame. Therefore, when the rotating electric machine gets larger, there have been problems in that a size of the outer frame of the rotating electric machine is increased, so that it is difficult that the rotating electric machine is transported by a railway or the like.

The present invention has been made to solve above-described problems, and an object of the invention is to provide a totally-enclosed horizontal rotating electric machine in which a length of a main body of a heat exchanger is not limited, and contact portions for feed-water pipes and the drain pipes, which are installed in a pit on a base, are easily formed, and moreover, the heat exchanger can be easily disassembled and assembled, and the rotating electric machine can be easily transported by a railway or the like.

Means for Solving Problems

In a totally-enclosed horizontal rotating electric machine of the present invention, a rotor horizontally arranged and a stator arranged at an outer circumference side of the rotor are hermetically sealed in a main frame, and the rotor and the stator are cooled by circulating refrigerant gas, which is encapsulated in the main frame, through a refrigerant passageway, and water-cooled heat exchangers for cooling the refrigerant gas are provided on the way of the refrigerant passageway; in which the heat exchangers are respectively arranged in a longitudinal direction at each of positions neighboring both left-right end portions at a front side and both left-right end portions at a rear side of the main frame, in a state where the main frame is viewed from a side-surface direction orthogonal to an axis line of the rotor, and a feed-water inlet and a drain outlet of cooling water are provided at an upper side of the heat exchangers.

Effects of the Invention

According to the totally-enclosed horizontal rotating electric machine of the present invention, the heat exchangers are respectively arranged in a longitudinal direction at each of positions neighboring both left-right end portions at a front side and both left-right end portions at a rear side of the main frame, in a state where the main frame is viewed from a side-surface direction orthogonal to an axis line of the rotor, and a feed-water inlet and a drain outlet of cooling water are provided at an upper side of the heat exchangers, so that a length of the main portion of the heat exchanger can be more increased in comparison with a case where the feed-water inlet and the drain outlet are provided at a lower side of the heat exchangers, and a cooling capacity of the heat exchanger can be improved.

MODE FOR CARRYING OUT THE INVENTION

Embodiment 1

Figure 1:
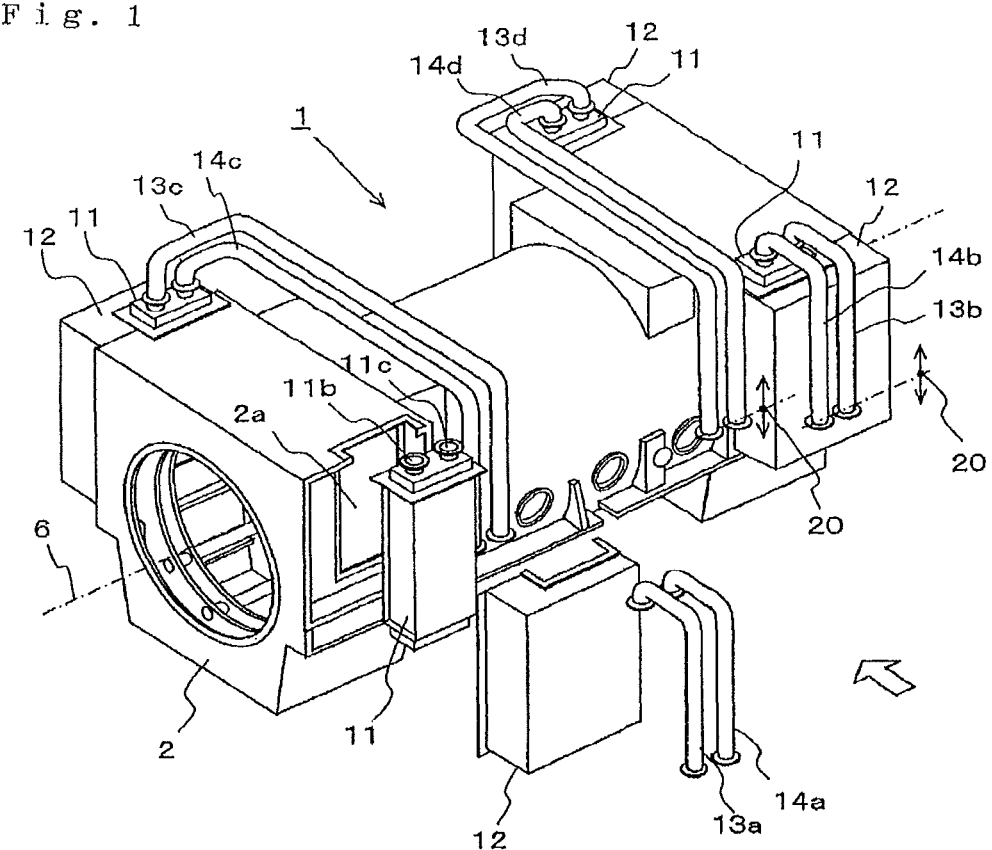
FIG. 1 is an oblique perspective view illustrating a main portion of a totally-enclosed horizontal rotating electric machine according to Embodiment 1 of the present invention.
Figure 2:
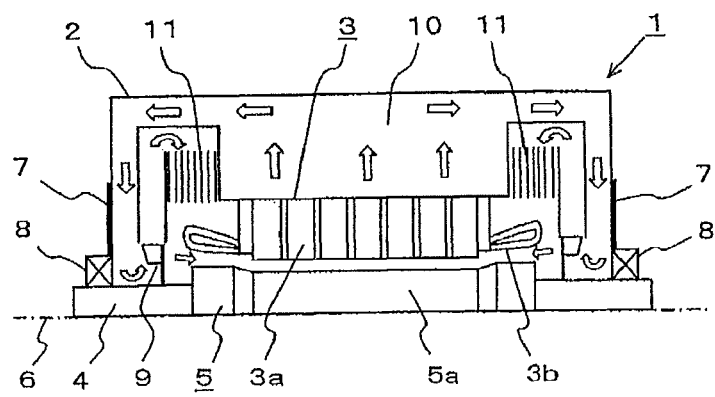
FIG. 2 is a partial-plane cross-sectional view schematically illustrating an internal configuration of the totally-enclosed horizontal rotating electric machine according to Embodiment 1 of the present invention.

Hereinafter, Embodiment 1 of the present invention will be explained in reference to drawings. FIG. 1 is an oblique perspective view illustrating a main frame of a rotating electric machine and main portions such as heat exchangers and heat-exchanger covers. Here, a rotor is not illustrated in FIG. 1, and inner components are viewed in this state. FIG. 2 is a plane cross-sectional view schematically illustrating an internal configuration of the rotating electric machine, and illustrates a half side of the rotating electric machine viewed from a center axis line.

In addition, the rotating electric machine according to the present invention is a totally-enclosed horizontal rotating electric machine, in which a rotary is disposed in a horizontal direction, and a cooling medium is sealed, and moreover, a water-cooled heat exchanger is included. However, an example of a synchronous generator as a rotating electric machine will be explained in the following description. As a matter of course, an electric motor may be explained as the rotating electric machine.

Firstly, a schematic configuration of the generator will be explained in reference to FIG. 2.

In a generator 1, a stator 3 having a cylindrical shape is disposed in a main frame 2, and a rotor 5, which is rotated with a rotary shaft 4 centering an axis line 6, is disposed at an inner circumference side of the main frame 2 in a state where the axis line 6 is extended in a horizontal direction.

The stator 3 is configured in such a way that a stator core 3a is laminated in a state where cooling-gas passages spaced every predefined distance are provided, and a stator coil 3b is inserted to a plurality of slots formed in an axial direction in an inner circumference side of the stator core 3a.

Meanwhile, the rotor 5 has an outside diameter by which a predefined gas void can be ensured between an inner circumference of the stator 3 and the rotor 5. The rotor 5 is composed of the rotary shaft 4, a rotor core 5a for forming a magnetic pole, and a rotor coil (not illustrated) inserted to the slots of the rotor core 5a, and is supported by a bearing 8 that is provided at an inner circumference portion of an end bracket 7 for blocking an aperture of both ends of the main frame 2.

Beside the rotary shaft 4 of the rotor 5, a fan 9 is provided at an inside of the main frame 2, and refrigerant gas 10 (for example, air, hydrogen gas or the like), which is encapsulated in the main frame 2, is circulated in the rotating electric machine by rotating the fan 9 in accordance with a rotation of the rotary shaft 4. The inside of the main frame 2 is suitably separated by guide plates in order to effectively circulate the refrigerant gas 10, whereby a refrigerant passageway is formed. Moreover, water-cooled heat exchangers 11 for cooling the refrigerant gas 10 are provided on the way of the refrigerant passageway.

Secondly, a detail explanation for peripheral portions of the heat exchanger 11 will be explained in reference to FIG. 1.

In FIG. 1, each of the heat exchangers 11—total four heat exchangers—is arranged in a longitudinal direction at each of four positions neighboring both left-right end portions at a front side and both left-right end portions at a rear side of the main frame 2, in a state where the main frame 2 is viewed from a direction indicated by the thick arrow, that is, from a side-surface direction orthogonal to the axis line 6 of the rotor 5.

Although a detail explanation for the heat exchangers 11 will be performed in the following description, outer surfaces of main portions of the heat exchangers 11 are exposed in the refrigerant passageway formed inside of the main frame 2. A heat exchange is performed by circulating cooling water inside the heat exchangers 11, whereby the refrigerant gas 10 is cooled. Thus, a feed-water inlet 11b and a drain outlet 11c, which are gates for the cooling water, are provided in the heat exchangers 11.

The cooling water is flowed from a cooling-water supplier (not illustrated) disposed at an outside of the generator 1 to the heat exchangers 11 via a distribution pipe installed in a pit provided on a base ground surface on which the generator 1 is disposed, so that feed-water pipes 13a through 13d and drain pipes 14a through 14d, which are extended to contact portions 20 at the generator 1 side, are distributed toward an outside of the main frame 2. Pathways of the distribution pipes are explained in the following description.

In FIG. 1, one of the four heat exchangers 11, which is illustrated at a front-left side viewed from a thick arrow direction, indicates a state where the heat exchanger 11 is dismounted from the main frame 2. In this state, the heat exchanger 11, a heat-exchanger cover 12, and the feed-water pipe 13a and the drain pipe 14a, which are connected to the heat exchanger 11, are dismounted. When the components are assembled, those are similarly mounted as one of the four heat exchangers 11, which is illustrated at a front-right side.

Figure 3:
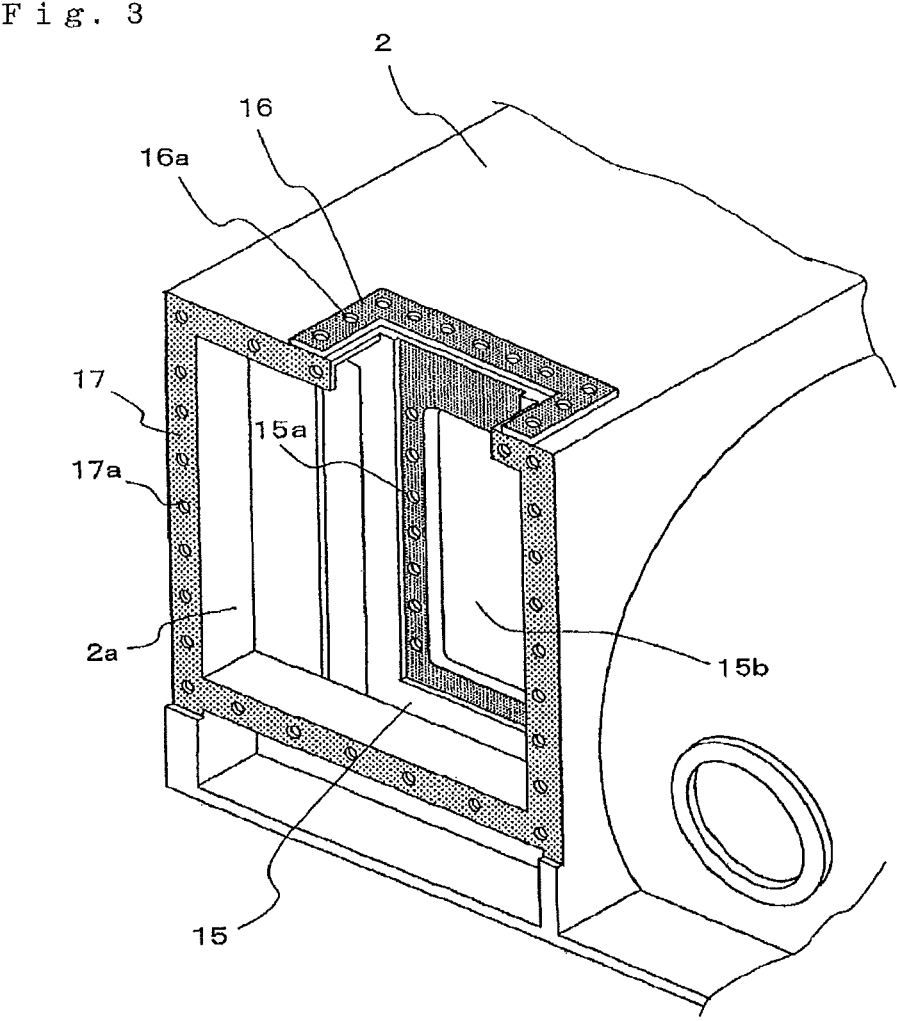
FIG. 3 is an oblique perspective view illustrating an attachment portion of a heat exchanger in FIG. 1.

Thirdly, a detail explanation for an attachment portion of the main frame 2, to which the heat exchanger 11 and the heat-exchanger covers 12 are attached, will be explained in reference to FIG. 3.

A heat-exchanger attaching plate 15 is provided at a position of the main flame 2, to which the heat exchanger 11 is attached. An aperture 15b composing the refrigerant passageway and screw holes 15a for attaching the heat exchanger 11 are provided on the heat-exchanger attaching plate 15. Moreover, screw holes 16a are formed on an attachment washer 16 which is provided around a notched portion formed by notching a portion on an upper surface of the main frame 2. In FIG. 3, a portion indicated by a dark hatch pattern is an attaching surface for the heat exchanger 11.

Meanwhile, a large aperture 2a for attaching the heat-exchanger cover 12 is formed at a lateral surface of the main frame 2, and screw holes 17a for attaching the heat-exchanger cover 12 are formed on a cover-attachment flange 17 provided around the large aperture 2a. In FIG. 3, a portion indicated by a tinted hatch pattern is an attaching surface for the heat-exchanger cover 12.

Fourthly, the heat exchanger 11 will be explained in reference to FIG. 4.

A water chamber 11a, in which guided cooling water is temporarily stored, is provided on an upper portion of the heat exchanger 11, and an inside of the water chamber 11a is separated so as to be formed two rooms. The feed-water inlet 11b is provided in a state where the feed-water inlet 11b is linked with one of the rooms, and the drain outlet 11c is provided in a state where the drain outlet 11c is linked with the other room. Moreover, a plurality of thin pipes 11d are provided at an lower portion of the water chamber 11a in such a way that thin pipes 11d are shuttled via the water chamber at the lower side so as to link a water chamber at the feed-water inlet side to a water chamber at the drain outlet side, and many fins are attached to the thin pipes 11d.

Figure 4:
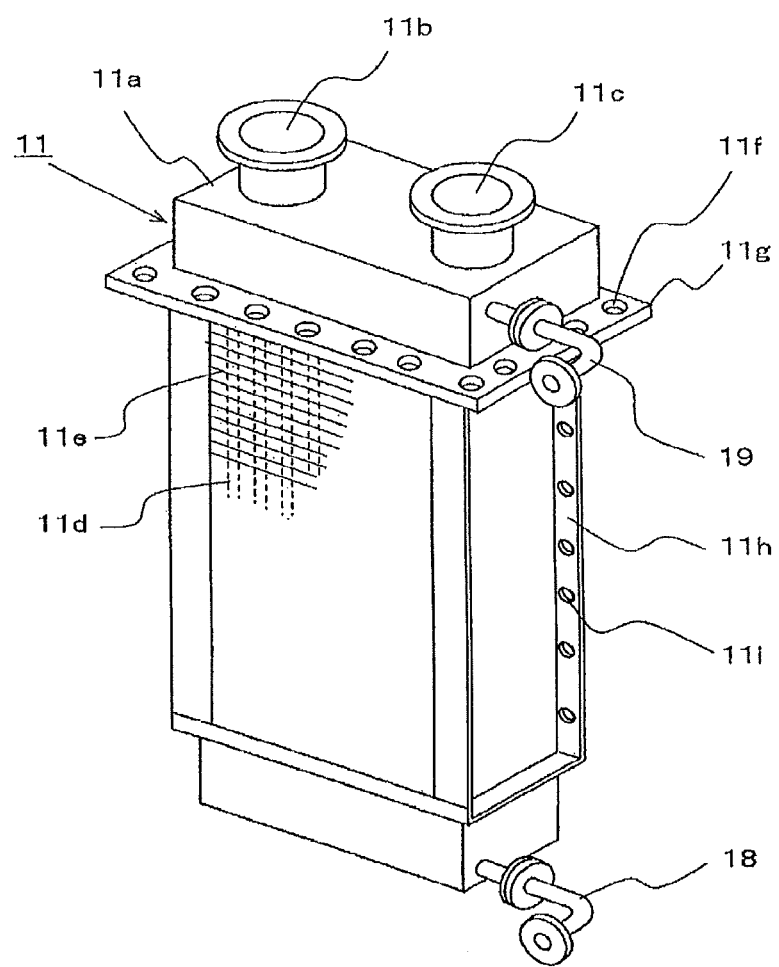
FIG. 4 is an oblique perspective view illustrating the heat exchanger in FIG. 1.

In order to attach and fix the heat exchanger 11 to the main frame 2, a flange-shaped attachment flange 11g, which includes attachment holes 11f, is provided around a lower portion of the water chamber 11a, and then, attachment holes 11i corresponding to the screw holes 15a formed at the above-described heat-exchanger attaching plate 15 of the main frame 2 are formed at an a frame 11h, which is positioned at a rear side in FIG. 4, within frames for installing a main portion of the heat exchanger positioned at an lower side of the flange-shaped attachment flange 11g.

In a water chamber at the lower side of the heat exchanger 11, a drain pipe 18 for removing the cooling water that cannot be totally removed by the drain pipe.

Moreover, when feed water is stated or water has been fed, air in the feed-water pipe or air mixed in the cooling water is entered into the heat exchanger 11, so that a bend pipe 19 for removing the air is provided.

Fifthly, the heat-exchanger cover 12 will be explained in reference to FIG. 5.

Figure 5:
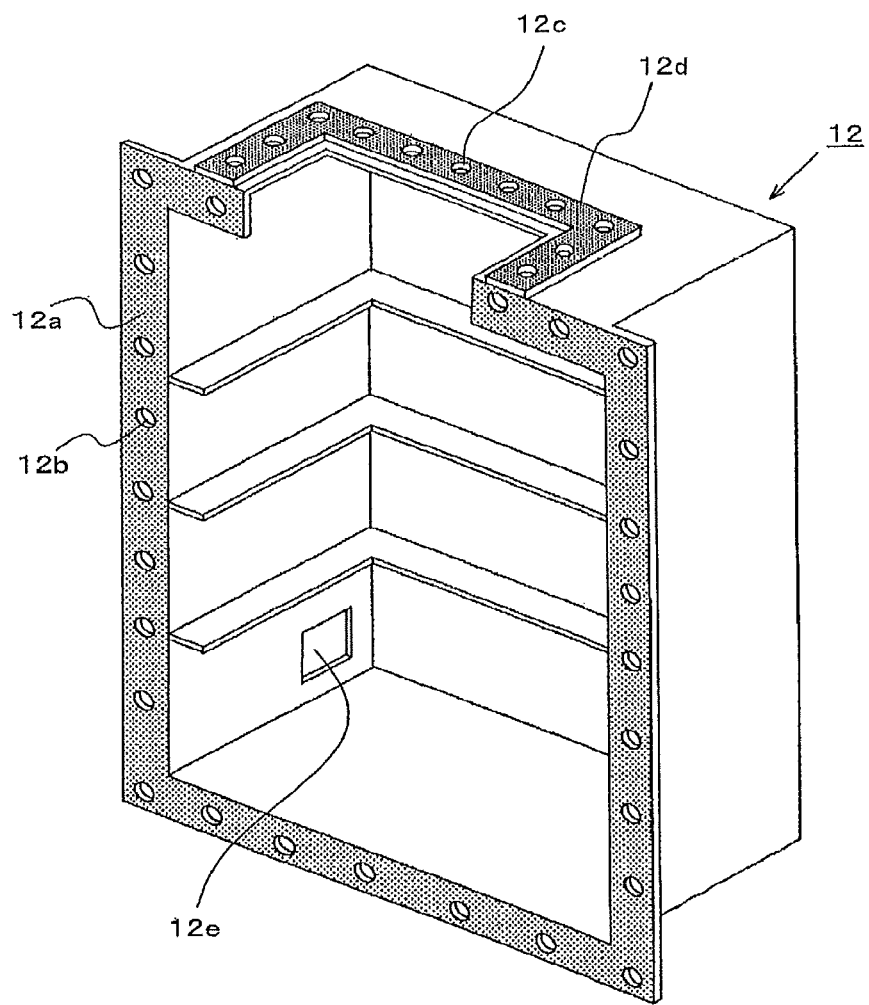
FIG. 5 is an oblique perspective view illustrating the heat-exchanger cover in FIG. 1
Figure 6:
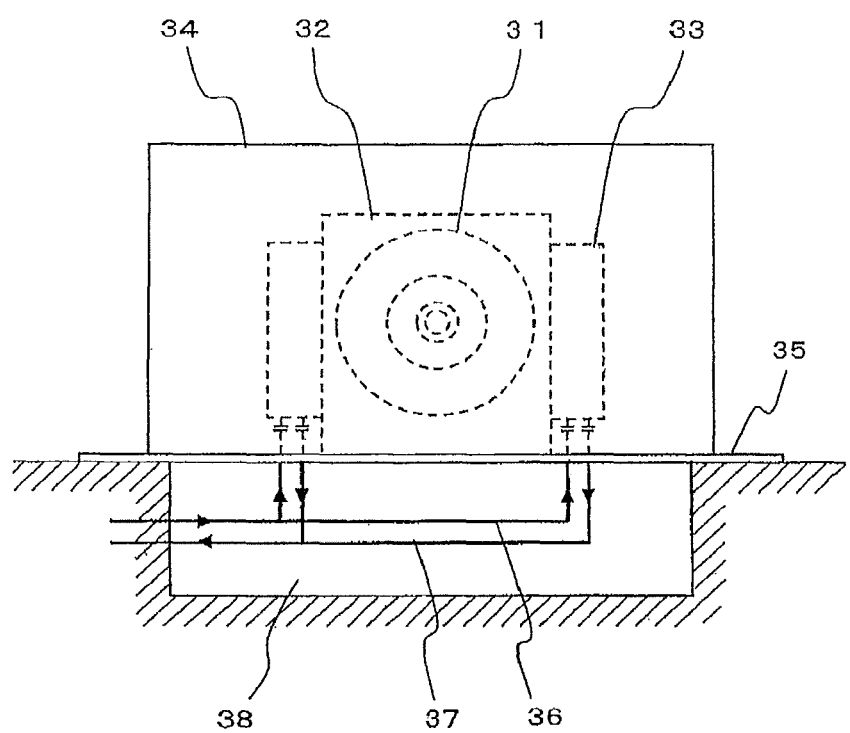
FIG. 6 is a schematic front view illustrating a conventional totally-enclosed horizontal rotating electric machine.

FIG. 5 is an oblique perspective view illustrating the heat-exchanger cover 12 viewed from the heat exchanger 11. The whole heat-exchanger cover 12 has a rectangular box-shape in a state where one side of the cover 12 is fully opened, and a portion of the upper surface near the aperture side is notched. An attachment flange 12a is provided at a circumference of the aperture side, and attachment holes 12b are formed at the attachment flange 12a. Moreover, an attachment washer 12d having screw holes 12c is attached at a circumference of the notched portion at the upper surface. A drain-pipe hole 12e corresponding to the drain pipe 18 of the heat exchanger 11 is opened at the lower side of the heat-exchanger cover 12.

In FIG. 5, a portion indicated by a dark hatch pattern is an attaching surface for the heat exchanger 11, and a portion indicated by a tinted hatch pattern is an attaching surface for attaching the heat-exchanger cover 12 to the main frame 2.

The assembly of the heat exchanger 11, the heat-exchanger cover 12, and each of the distribution pipes of the generator 1, which are configured as described above, will be explained in the following description.

In a state where the components of the heat exchanger 11, which are viewed from a direction indicated by the thick arrow in FIG. 1, are disassembled, the heat exchanger 11 is firstly inserted in a direction from the aperture 2a of the main frame 2 to the inside of the generator 1, and the attachment flange 11g of the heat exchanger 11 is fitted to the attachment washer 16 at the upper surface side of the main frame 2. Meanwhile, the attachment holes 11i formed at the frame 11h of the heat exchanger 11 are fitted to the screw holes 15a formed at the heat-exchanger attaching plate 15 inside the main frame 2. At this time, a gasket (not illustrated) is sandwiched at each of joint surfaces in order to keep airtightness. In the state, bolts are screwed from the outside to the screw holes so as to be fastened, whereby the heat exchanger 11 is attached to the main frame 2.

Secondly, the attachment washer 12d positioned at an upper portion of the heat-exchanger cover 12 is fitted to the attachment flange 11g of the heat exchanger 11, and the attachment flange 12a of the heat-exchanger cover 12 is fitted to the cover-attachment flange 17 formed at the aperture 2a of the main frame 2. A gasket (not illustrated) is sandwiched at a fitting surface. Moreover, before the components are combined, the drain pipe 18 of the heat exchanger 11 is penetrated through the drain-pipe hole 12e. After the components are combined, each of bolts is respectively inserted to each of attachment holes, and respectively screwed into the corresponding screw hole, whereby the heat-exchanger cover 12 is fastened and fixed.

In a similar way, the other heat exchangers 11 and heat-exchanger covers 12, which are provided at the other positions, are totally attached.

In addition, a gap between the drain-pipe hole 12e and the heat-exchanger cover 12 is hermetically sealed. Moreover, after the components are combined, the drain pipe 18 and the bend pipe 19 are connected to a drain-distribution pipe (not illustrated).

Thirdly, feed-water pipes and drain pipes are attached.

The feed-water pipes 13a and 13b and the drain pipes 14a and 14b, which are respectively connected to the both heat exchangers 11 positioned at left-right sides at a front surface, have a reverse "J" shape. The feed-water pipes 13c and 13d and the drain pipes 14c and 14d, which are respectively connected to the both heat exchangers 11 positioned at left-right sides at a rear surface, have a shape in which the pipes respectively rise from each of feed-water inlets and drain outlets and horizontally extend toward a center side in a direction along the axis line 6, and the pipes respectively loop back 90 angle-degrees and horizontally extend toward a front side, and then, the pipes respectively loop back 90 angle-degrees toward a lower side at the front side. In addition, each of the feed-water pipes and the drain pipes is supported at the main frame 2 by a supporting component (not illustrated).

After the pipes are attached, each of the feed-water pipes and the drain pipes as well as the contact portions 20 for feed-water pipes and drain pipes (not illustrated), which are distributed in a pit at a base side, is aligned at a lower side at the front surface of the generator 1. In addition, the whole contact portions 20 may be positioned at the rear surface side.

Characteristics and operation effects of the totally-enclosed horizontal rotating electric machine, which is configured as described above, according to Embodiment 1 will be explained in the following description.

It is a first point that the feed-water inlet and the drain outlet of the heat exchanger are arranged at the upper side of the heat exchanger so as to be extended upward. Before the rotating electric machine is disposed, water-distribution pipes for feeding and draining water from/to the heat exchanger of the rotating electric machine are distributed from a cooling-water supplier (not illustrated) to an inside of the pit provided at the base surface, on which the rotating electric machine is disposed, and the feed-water pipes and the drain pipes distributed from the cooling-water supplier are connected to the feed-water pipes and the drain pipes of the heat exchanger of the rotating electric machine when the rotating electric machine is disposed. It is a general way that this connect portion, or the contact portion is previously determined, and a manufacturing company for the rotating electric machine manufactures distribution pipes extended to the contact portions so as to deliver the pipes, and the manufactured pipes are connected to the feed-water pipes and the drain pipes, which are distributed in the other side, at the contact portion on a site.

If the feed-water inlet and the drain outlet of the heat exchanger are extended downward, there have been problems in that a water chamber must be provided at the lower side of the heat exchanger, and space for connection work is required because the contact portion is positioned just below the heat exchanger, and a cooling capacity of the heat exchanger is limited because a length of a main portion of the heat exchanger is reduced. However, because the feed-water inlet and the drain outlet are provided at the upper portion, a length of the main portion of the heat exchanger can be increased, and a cooling capacity of the heat exchanger can be improved.

Moreover, because the feed-water inlet and the drain outlet are opened upward, it is not required that the feed-water pipes and the drain pipes are penetrated though the heat-exchanger cover 12 and pulled out, so that only a portion of the drain pipe 18 is used as a penetrated portion that is penetrated from the inside to the outside in the heat-exchanger cover 12. Therefore, a sealed portion is decreased at a circumference surface on which a sealing capacity is low, whereby an assemble work becomes simply, and a sealing capacity can be increased.

It is a second point that the feed-water pipes and the drain pipes extended from four heat exchangers 11 are assembled and pulled out toward one side (front side in FIG. 1) of the generator 1, and the contact portions 20 assembled at a lower portion at one side of the generator 1. Because the feed-water inlet and the drain outlet of the heat exchangers 11 are opened upward, the feed-water pipes and the drain pipes are more freely distributed from the heat exchangers 11 to the contact portions 20, and the pipes can be more easily distributed, whereby the contact portions 20 can be easily assembled at one side. Therefore, pathways of the distribution pipes in the pit can be simply set, and working of the distribution pipes can be easily performed.

It is a third point that the heat exchangers 11 and the heat-exchanger covers 12 are easily disassembled with respect to the main frame 2. Because the feed-water inlet and the drain outlet of the heat exchangers 11 are opened upward, a distribution-connection surface, that is a seal surface, can be configured by a simple surface, whereby a hermetic capacity can be simply kept, and a configuration in which the components can be simply disassembled. Moreover, because the seal surface can be configured by a simple surface, the seal capacity can be increased.

Because the rotating electric machine has a configuration in which the components can be disassembled, even if the rotating electric machine has a large power capacity and gets larger, a size of the rotating electric machine can be set within transport limitation, and an area, in which the rotating electric machine can be transported by a railway or the like, can be expanded.

As described above, in the totally-enclosed horizontal rotating electric machine according to Embodiment 1, a rotor horizontally arranged and a stator arranged at an outer circumference side of the rotor are hermetically sealed in a main frame, and the rotor and the stator are cooled by circulating refrigerant gas, which is encapsulated in the main frame, through a refrigerant passageway, and water-cooled heat exchangers for cooling the refrigerant gas are provided on the way of the refrigerant passageway; in which the heat exchangers are respectively arranged in a longitudinal direction at each of positions neighboring both left-right end portions at a front side and both left-right end portions at a rear side of the main frame, in a state where the main frame is viewed from a side-surface direction orthogonal to an axis line of the rotor, and a feed-water inlet and a drain outlet of cooling water are provided at an upper side of the heat exchangers, so that a length of the main portion of the heat exchanger can be more increased in comparison with a case where the feed-water inlet and the drain outlet are provided at a lower side of the heat exchangers, and a cooling capacity of the heat exchanger can be improved.

Moreover, it is not required that the feed-water pipes and the drain pipes are penetrated though the heat-exchanger cover 12 and pulled out, so that a sealed portion at a penetrated portion is decreased, whereby an assemble work becomes simply, and a sealing capacity can be increased.

Moreover, feed-water pipes connected to the feed-water inlet and drain pipes connected to the drain outlet of the heat exchangers are distributed from the feed-water inlet and the drain outlet to a portion neighboring a lower portion at the front side or rear side of the main frame, and contact portions for a cooling-water-distribution pipe extended from a cooling-water supplier disposed at an outside area of the rotating electric machine are assembled at the front side or the rear side of the main frame, so that a pathway of the feed-water pipes and the drain pipes of the other side, which are connected to the contact portions, can be simply set, and working of the distribution pipes can be easily performed.

Moreover, because the heat exchangers and heat-exchanger covers, which surround main portions of the heat exchangers so as to form a portion of the refrigerant passageway and protect the heat exchangers, are detachably attached to the main frame, even if the rotating electric machine has a large power capacity and gets larger, a size of the rotating electric machine can be set within transport limitation, whereby an area, in which the rotating electric machine is transported by a railway or the like, can be expanded.

What is claimed is:

1. A totally-enclosed horizontal rotating electric machine in which a rotor horizontally arranged and a stator arranged at an outer circumference side of the rotor are hermetically sealed in a main frame, and the rotor and the stator are cooled by circulating refrigerant gas, which is encapsulated in the main frame, through a refrigerant passageway, and water-cooled heat exchangers for cooling the refrigerant gas are provided on the way of the refrigerant passageway; wherein
the heat exchangers are respectively arranged in a longitudinal direction at each of positions neighboring both left-right end portions at a front side and both left-right end portions at a rear side of the main frame, in a state where the main frame is viewed from a side-surface direction orthogonal to an axis line of the rotor, and a feed-water inlet and a drain outlet of cooling water are provided at an upper side of the heat exchangers.

2. A totally-enclosed horizontal rotating electric machine as recited in claim 1, wherein main portions of the heat exchangers are surrounded by heat-exchanger covers, and the feed-water inlet and the drain outlet of cooling water for the heat exchangers are provided at upper sides, which are not surrounded by heat-exchanger covers, of the heat exchangers.

3. A totally-enclosed horizontal rotating electric machine as recited in claim 1, wherein feed-water pipes connected to the feed-water inlet and drain pipes connected to the drain outlet of the heat exchangers are distributed from the feed-water inlet and the drain outlet to a portion neighboring a lower portion at the front side or rear side of the main frame, and contact portions for a cooling-water-distribution pipe from a cooling-water supplier disposed at an outside area of the rotating electric machine are assembled at the front side or the rear side of the main frame.

4. A totally-enclosed horizontal rotating electric machine as recited in claim 2, wherein feed-water pipes connected to the feed-water inlet and drain pipes connected to the drain outlet of the heat exchangers are distributed from the feed-water inlet and the drain outlet to a portion neighboring a lower portion at the front side or rear side of the main frame, and contact portions for a cooling-water-distribution pipe from a cooling-water supplier disposed at an outside area of the rotating electric machine are assembled at the front side or the rear side of the main frame.

5. A totally-enclosed horizontal rotating electric machine as recited in claim 1, wherein the heat exchangers and heat-exchanger covers, which surround main portions of the heat exchangers so as to form a portion of the refrigerant passageway and protect the heat exchangers, are detachably attached to the main frame.

6. A totally-enclosed horizontal rotating electric machine as recited in claim 2, wherein the heat exchangers and heat-exchanger covers, which surround main portions of the heat exchangers so as to form a portion of the refrigerant passageway and protect the heat exchangers, are detachably attached to the main frame.

7. A totally-enclosed horizontal rotating electric machine as recited in claim 3, wherein the heat exchangers and heat-exchanger covers, which surround main portions of the heat exchangers so as to form a portion of the refrigerant passageway and protect the heat exchangers, are detachably attached to the main frame.

8. A totally-enclosed horizontal rotating electric machine as recited in claim 4, wherein the heat exchangers and heat-exchanger covers, which surround main portions of the heat exchangers so as to form a portion of the refrigerant passageway and protect the heat exchangers, are detachably attached to the main frame.

* * * * *